United States Patent [19]

Miller et al.

[11] Patent Number: 5,001,378
[45] Date of Patent: Mar. 19, 1991

[54] ROTOR WITH REDUCED WINDAGE LOSSES

[75] Inventors: William H. Miller, Albany, N.Y.; Warren R. Brook, Medford, N.J.; James J. Grant, Schenectady, N.Y.

[73] Assignee: REM Technologies, Inc., Albany, N.Y.

[21] Appl. No.: 402,070

[22] Filed: Sep. 1, 1989

[51] Int. Cl.⁵ .................. H02K 21/20; H02K 5/128
[52] U.S. Cl. ................................. 310/178; 310/86; 310/269
[58] Field of Search ............... 310/54, 87, 114, 168, 310/178, 261, 269, 42, 86, 263

[56] References Cited

U.S. PATENT DOCUMENTS

| | | | |
|---|---|---|---|
| 3,157,806 | 11/1964 | Wiedemann | 310/64 |
| 3,321,652 | 5/1967 | Opel | 310/263 |
| 3,737,696 | 6/1973 | Richter et al. | 310/168 |
| 4,024,628 | 5/1977 | Crites | 29/598 |
| 4,302,693 | 11/1981 | Burgmeier et al. | 310/156 |
| 4,423,344 | 12/1983 | Jones | 310/54 |
| 4,445,056 | 4/1984 | Gaylord | 310/54 |
| 4,617,485 | 10/1986 | Nakamura et al. | 310/263 |
| 4,786,834 | 11/1988 | Grant | 310/194 |
| 4,795,936 | 1/1989 | Crosetto et al. | 310/261 |

OTHER PUBLICATIONS

James Vrancik, "Prediction of Windage Power Loss in Alternators", Lewis Research Center, NASA, Jul. 26, 1968.

Primary Examiner—Steven L. Stephan
Assistant Examiner—D. L. Rebsch
Attorney, Agent, or Firm—Heslin & Rothenberg

[57] ABSTRACT

A homopolar, transverse pole rotor (14) having a central cylindrical body (24) with a set of circumferentially spaced, axially extending salient poles (28) at each end thereof, is constructed to reduce windage losses. Integral shrouds (29, 31) are placed on either side of each set of salient poles, and a relief is machined into the outer surface of each shroud to form an accentuated pole tip (64) which ensures magnetic centering of the rotor. To further minimize windage losses, the diameter of the central cylindrical body (24) can be reduced, and non-magnetic material can be secured within interpole recesses. Mechanical fasteners (66), dove tails (72) or tensioned circumferential banding (82) can be used to secure the non-magnetic interpole pieces to the rotor.

16 Claims, 6 Drawing Sheets

ROTOR WITH REDUCED WINDAGE LOSSES

BACKGROUND OF THE INVENTION

1. Technical Field

This invention relates generally to rotating dynamoelectric machines and more specifically to an improved rotor construction which exhibits reduced windage losses.

2. Background Art

Inductor type dynamoelectric machines have been employed, in the past, to realize high-speed operation, particularly for electrical generation. Such machines are generally characterized by a stator which includes both ac armature and dc excitation coils, surrounding a coil-less rotor. Since there are no rotating field or armature coils in this type of dynamoelectric machine, slip rings, brushes and associated connections, common to machines having rotating windings, may be entirely eliminated. This feature, coupled with the typical solid construction of the machine rotor, makes the inductor machine particularly adaptable to high rotational speed applications.

One known version of an inductor type dynamoelectric machine, employs a circumferentially distributed arrangement of "C" or "U" shaped armature elements surrounding a generally cylindrical field coil which in turn encloses a transverse pole magnetic rotor. U.S. Pat. Nos. 437,501, and 2,519,097 and 3,912,958 describe earlier machines of this general design. Such machines typically employed frame mounted hardware for directly supporting the individual components of the stator and suffered from deficiencies attendant to this construction.

A more recent version of such an inductor type machine is disclosed in commonly owned, U.S. Pat. No. 4,786,834, issued Nov. 22, 1988 in the name of James J. Grant, et al. The improvement described therein encompasses a spool-like support structure for supporting the field winding and armature element's from inside and for accurately positioning the armature elements. The spool-like structure is made of non-magnetic material and has a hollow, elongated central portion extending concentrically about a longitudinal axis. This central portion supports a field coil and defines an interior longitudinal passageway for accommodating the insertion of a coaxial rotor. At each end of the central portion, end portions extend radially outward therefrom. Each of these end portions is preferably provided with radially oriented grooves in its axially outermost surface. The grooves are configured to receive and orient legs of generally U-shaped armature core elements arrayed in a circumferentially distributed pattern about the periphery of the spool-like structure. The end portions of the spool-like structure are axially spaced and radially dimensioned, and the grooves in the outer face of each end portion are angularly spaced so as to precisely position the armature elements in three orthogonal directions.

For cooling purposes, cooling ports are provided in the central portion of the spool-like structure. These ports are located near the ends of the central portion and communicate with extended recesses in the surface of a unitary, transverse pole, salient, homopolar rotor mounted for rotation within the central portion. The rotor acts as an impeller and centrifugally propels cooling fluid through said cooling ports and into the vicinity of the field winding and armature coils.

Other features, aspects, advantages and benefits of this recently developed, highly acclaimed dynamoelectric machine are detailed in U.S. Pat. No. 4,786,834, the disclosure of which is incorporated by reference herein.

At high speeds, dynamoelectric machines employing salient pole rotors can experience substantial windage losses. These losses are due to air being drawn into the lowest part of the interpole recesses and then being slung outward toward the tip of the pole face. In a machine of the design of U.S. Pat. No. 4,786,834, this air is then forced to escape between the inner faces of the U-shaped armature pieces, which are only thousandths of inches from the pole tips, thus creating high windage losses, in addition to high acoustical noise. If the axial air flow to the bottom of the interpole recesses is blocked off, the majority of the windage losses due to this air path are eliminated, thus leaving more horsepower in the dynamoelectric machine for actual work.

In the past, it has been proposed to close the interpole recesses by fastening disc-like shrouds on the outside thereof or by filling the recesses with a non-magnetic material. (See U.S. Pat. Nos. 3,157,806 and 3,737,696, and NASA Report 701-011-0006-22 entitled "Prediction of Windage Power Loss in Alternators", dated July 26, 1968.) These approaches have served to reduce windage losses, but they suffer from certain shortcomings and have not been optimized to allow both for sustained high speed operation and convenient, economical construction of a rotor especially useful in a dynamoelectric machine of the type described in U.S. Pat. No. 4,786,834.

SUMMARY OF THE INVENTION

This need is satisfied, and additional benefits realized, in accordance with the principles of the present invention, by providing a transverse pole, salient, homopolar rotor with shrouds on the axially inner and axially outer sides of two axially spaced sets of circumferentially spaced salient poles having spaced recesses between the poles. The shrouds are integral with the poles to maximize structural strength and extend, in the radial direction, less than the poles to ensure magnetic centering. A central cylindrical body portion of the rotor axially extending between the inner shrouds preferably has a reduced radial extent, in comparison to the inner shroud, in order to further reduce windage losses.

In another aspect of the invention, the interpole recesses are filled with non-magnetic material to form an outer circumferentially extending cylindrical surface in the pole regions. The nonmagnetic material can be deposited by a plasma-arc hot wire welding process and then machined to produce the desired outer cylindrical surface.

In another aspect of the invention, the non-magnetic material may comprise machined inserts which can be secured in the interpole recesses by mechanical fasteners extending through the shrouds, dove tail connections, or tensioned circumferential banding.

In yet another aspect of the invention, the shrouds may be eliminated and the inserts provided with outwardly extending ears for cooperating with a pair of axially spaced circumferentially extending tensioned bands.

BRIEF DESCRIPTION OF THE DRAWINGS

These and other objects, advantages and features of the present invention will be more readily understood from the following detailed description, when considered in conjunction with the accompanying drawings, in which.

DETAILED DESCRIPTION

Figure 1:
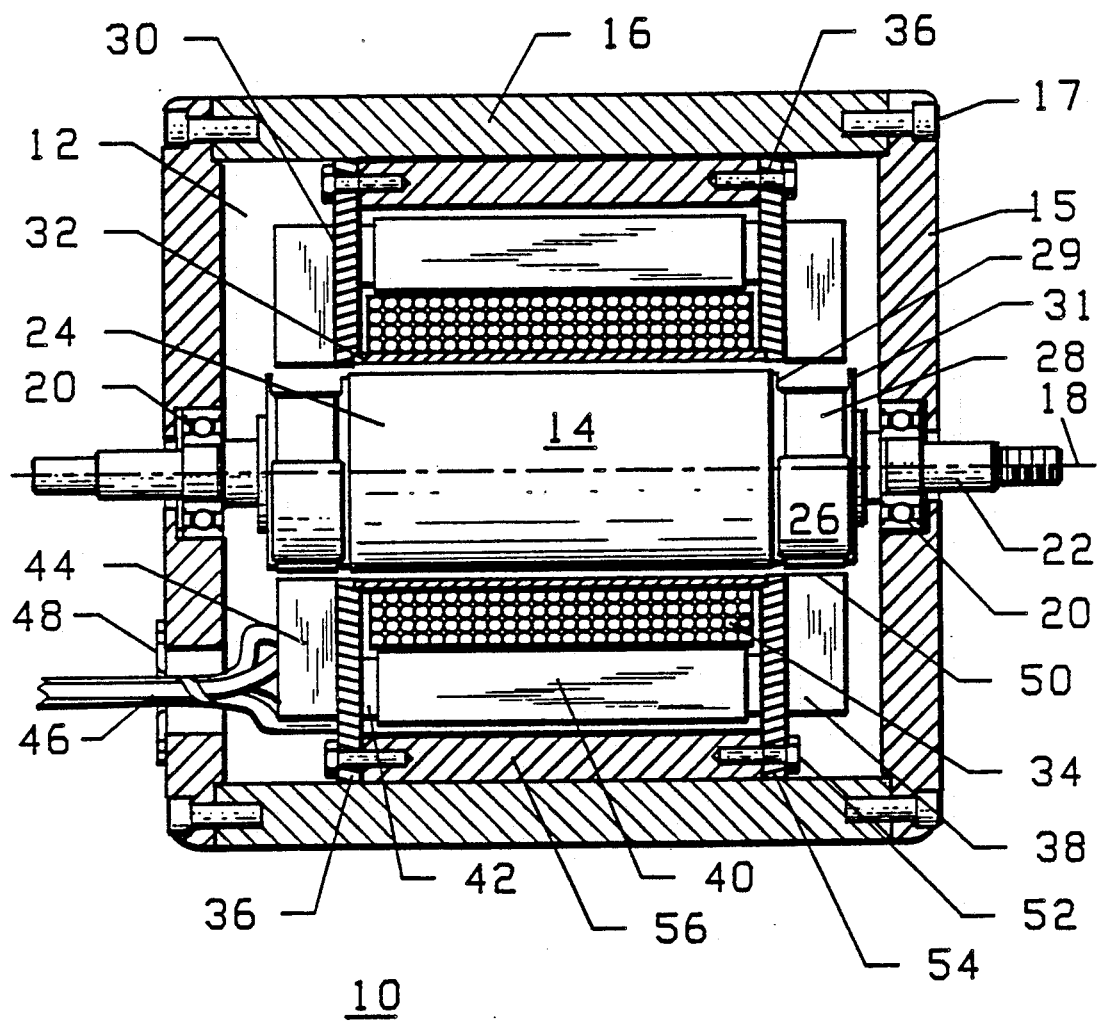
FIG. 1 is a cross-sectional view from the side of an inductor type dynamoelectric machine having a rotor constructed, in accordance with the principles of the present invention, to minimize windage losses.

In FIG. 1, a transverse-pole ac inductor type rotating dynamoelectric machine, constructed in accordance with the principles of the present invention is shown. The machine, generally denoted 10, includes a stationary stator assembly 12 surrounding a rotatable, coil-less rotor 14. A surrounding housing or frame 16 peripherally encloses stator assembly 12. End shields 15 are secured by threaded fasteners 17 to each end of housing 16 and rotatably support ends of rotor 14.

Stator assembly 12 includes an internal spool-like support structure 30. Support structure 30 has a central, generally cylindrical portion or tube 32 which is coaxial with longitudinal axis 18 and defines an interior, longitudinally extending, central passageway for receiving rotor 14. Field (or dc exitation) windings 34 are coiled about and supported by the exterior surface of tube 32.

Stator support structure 30 also includes a pair of end portions or plates 36 extending radially outward from the ends of tube 32. End portions 36 serve to mount and precisely position a plurality of circumferentially distributed, U-shaped (also referred to as C- or arch-shaped) armature core elements 38. Each armature core element 38 is preferably provided with an individual ac armature coil 40 wound about, and supported by a generally longitudinally extending base portion 42 of the armature element. Legs 44 extend radially inward from each end of base portion 42 of armature element 38. Armature core elements 38 are made of magnetic material while support structure 30 is composed of non-magnetic material, for example, aluminum. Electrical leads 46 from the field and armature coils extend through a suitable connector 48 mounted in one of the end shields 15.

Stator assembly 12 is preferably positioned and mounted within housing 16 by threaded fasteners 52 extending through radial extensions 54 of end portions 36 into intermediate mounting supports 56. Mounting supports 56 are circumferentially distributed about and secured to the interior of housing 16. This preferred mounting arrangement is described in detail in co-pending, commonly owned U.S. patent application Ser. No. 07/395,032 filed Aug. 17, 1989 entitled "Stator Mounting Arrangement".

Rotor 14 extends along and is coaxial with the longitudinal axis 18. The rotor preferably has a solid one-piece construction and is supported by bearings 20, at each end of rotor shaft 22. Bearings 20 are mounted within end shields 15. Rotor 14 has a central cylindrical body portion 24 provided with circumferentially spaced( axially extending surface recesses or cutouts 26 at the ends thereof, which define a desired number or set of lobes or salient poles 28 at each end of the homopolar transverse pole rotor. As described in detail hereinafter, inner shrouds 29 and outer shrouds 31 are provided on either side of each set of salient poles 28 to reduce windage losses. The rotor can be constructed of any available magnetic material, for example, carbon steel.

Operation of machine 10 is typical of synchronous ac machines in that, if electric current is applied to the field windings 34, and the rotor 14 is rotated by some external means, voltage will be induced in the armature windings 40 in the manner of a generator. Similarly, if the armature windings are energized in a fashion such as to produce a rotating flux wave at the gap 50, which exists between the radially innermost ends of armature elements 38 and the rotor pole surfaces 28, as is done in polyphase, ac synchronous machines, the rotor 14 of the machine will be urged to follow the armature flux wave and rotate in the manner of an electric motor.

Further details of the construction and operation, and of the benefits afforded by an inductor type rotating dynamoelectric machine of this general configuration can be obtained by referring to U.S. Pat. No. 4,786,834. The end portions 36 of spool-like support structure 30 can be of a laminate construction, as described in commonly owned, copending U.S. application Ser. No. 226,048, filed July 29, 1988 now U.S. Pat. No. 4,864,176.

Figure 2:
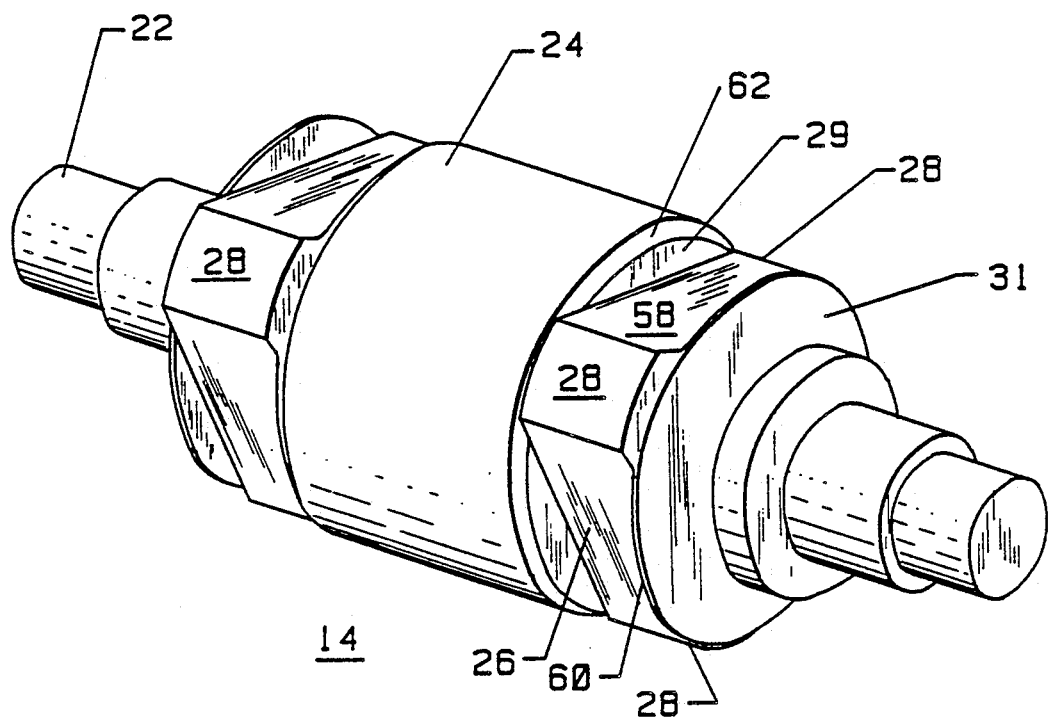
FIG. 2 is an isometric view of the rotor of FIG. 1.

A preferred embodiment of the improved rotor 14 of the present invention is illustrated in FIG. 2. As shown, located on each end of the central cylindrical body 24 is a set of circumferentially spaced axially extending salient poles 28. The poles in each set are separated by interpole recesses 26, preferably having flat landings or bases 58. Although three equally spaced salient poles 28 are shown in each set, the number, spacing and other characteristics of the poles may vary in accordance with machine design specifications.

To reduce windage power losses, an outer shroud 31 is provided at the axially outer end of each set of salient poles 28. Shroud 31 closes the outer end of recesses 26 blocking axial air flow into the recesses and thereby reducing windage losses. Shroud 31 is formed from the same piece of material as cylindrical body 24 and poles 28. This integral, one-piece construction, allows the rotor to achieve high speeds and high horsepowers without the risk of pieces or parts separating from the rotor body during such operation.

Shroud 31 preferably has a disc-like shape. The outer circumferential surface 60 of shroud 31 is machined down such that the pole face extends radially beyond the shroud 31. The relief 60 formed along the outer edge of shroud 31 serves to ensure magnetic centering of the rotor as described in greater detail hereinafter.

An inner shroud 29 is provided at the axially inner end of each set of salient poles 28. In the embodiment illustrated in FIG. 2, shroud 29 comprises the axially outer portion of central cylindrical body 24. As with shroud 31, a circumferential slot or relief 62 is machined along the outer edge of shroud 29 so that the outer faces of poles 28 extend radially farther than inner shroud 29. Inner shroud 29 is, of course, integral with the rest of rotor 14.

Figure 3:
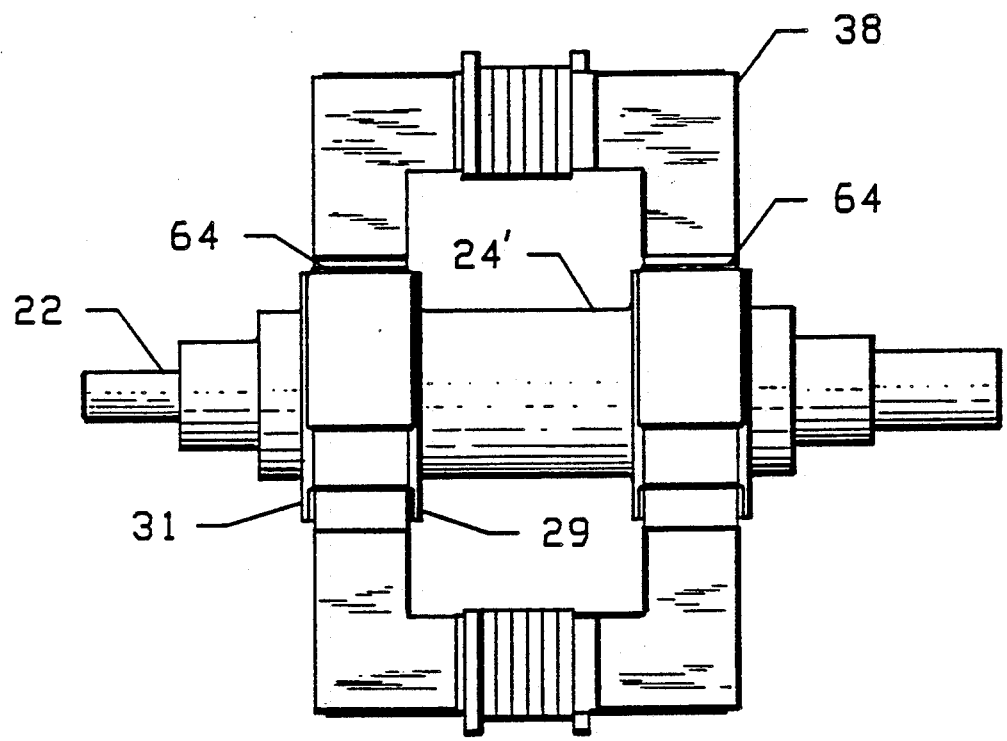
FIG. 3 is a side-elevational view useful in understanding the magnetic centering feature of the present invention and depicting a reduced diameter central body portion of the rotor which further reduces windage losses.

As best seen in FIG. 3, the reliefs 60 and 62 in the outer shroud 31 and inner shroud 29, respectively, form accentuated pole tips 64. Accentuated pole tips 64 extend farther in the radial direction than shrouds 29 or 31 and are therefore nearer to the inner faces of armature cores 38. This is significant because the shrouds, being formed of the same material as poles 28, are magnetic. The accentuated pole tips prevent the shrouds from being attracted into the magnetic field under the armature cores and thus the rotor stays on its magnetic center. This feature allows the rotor to be mounted without a thrust bearing and eliminates unwanted axial movement and forces which might lead to a shortening of the bearing life. The accentuation of the pole tips also reduces flux leakage.

The amount of material machined away along the outer surface of inner shroud 29 and outer shroud 31 may vary. In a prototype machine, approximately 4% of the rotor radius (i.e. the radius of central cylindrical body 24) was machined away.

In higher horsepower dynamoelectric machines, windage losses are also created by the large smooth central cylindrical rotor body turning at a high rate of speed. The peripheral velocity of this cylindrical surface causes significant windage losses which are separate from the losses caused by the interpole recesses. The diameter of the pole area of the rotor is critical to the horsepower rating of the machine, however the diameter of the axially inner cylindrical rotor body has no effect on this determination. Therefore, as shown in FIG. 3, the central cylindrical body 24' can be reduced in diameter relative to the inner shrouds 29, reducing the peripheral velocity and thereby further reducing windage losses.

To further minimize windage losses, an outer cylindrical surface can be produced in the pole region of the rotor by filling interpole recesses 26 with non-magnetic material. FIGS. 4-9 illustrate alternate approaches for achieving such enhanced benefits.

Figure 4:
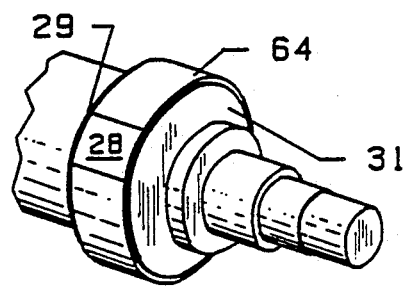
FIG. 4 is a partial isometric view of another embodiment of the rotor of the present invention.
Figure 4A:
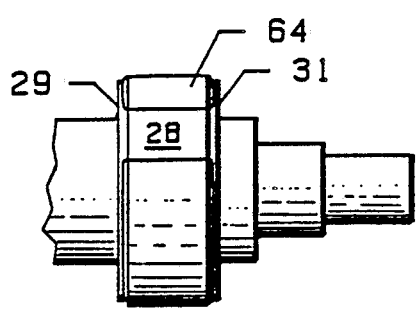
FIG. 4A is a side-elevational view of the rotor of FIG. 4.
Figure 4B:
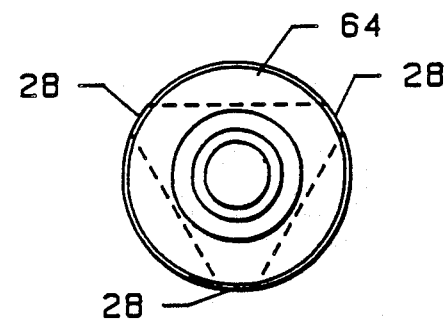
FIG. 4B is an end-elevational view of the rotor of FIG. 4.

FIGS. 4, 4A and 4B depict an embodiment in which the regions between salient poles 28 and opposed faces of shrouds 29 and 31, are filled with a non-magnetic material 64 which can be deposited by a plasma-arc hot wire welding process. The assembly can then be machined into the desired cylindrical shape. The bond between the magnetic material of the rotor and the non-magnetic material 64 should be strong enough to withstand the mechanical centrifugal forces experienced by the rotor at high speeds.

Figure 5:
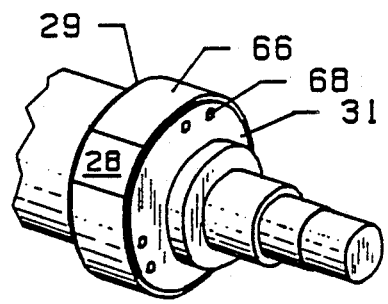
FIG. 5 is a partial isometric view of a further embodiment of the present invention employing mechanical fasteners for securing non-magnetic material in interpole recesses.
Figure 5A:
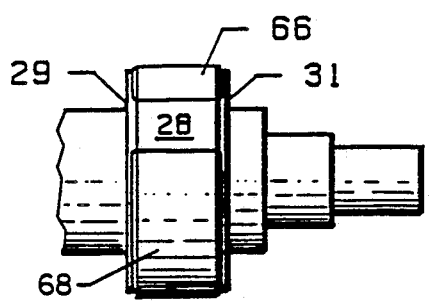
FIG. 5A is a side-elevational view of the rotor of FIG. 5.
Figure 5B:
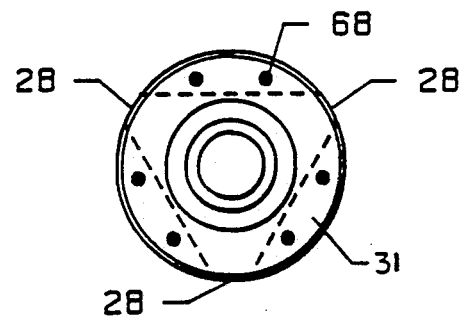
FIG. 5B is an end-elevational view of the rotor of FIG. 5.

FIGS. 5, 5A and 5B illustrate a similar construction employing partially machined blocks or inserts 66 which are inserted into the interpole spaces and held there by mechanical fasteners 68. Fasteners 68 extend axially through the inner and outer shrouds and the sandwiched insert 66 to securely fasten the non-magnetic inserts to the rotor. After inserts 66 are so mounted and fastened, the outer surface in the pole area can be machined to the desired smooth cylindrical shape.

Figure 6:
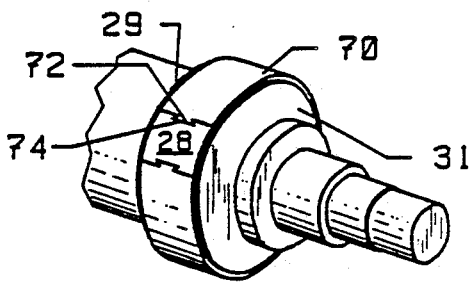
FIG. 6 is a partial isometric view of another embodiment of the rotor of the present invention employing dove tail connections.
Figure 6A:
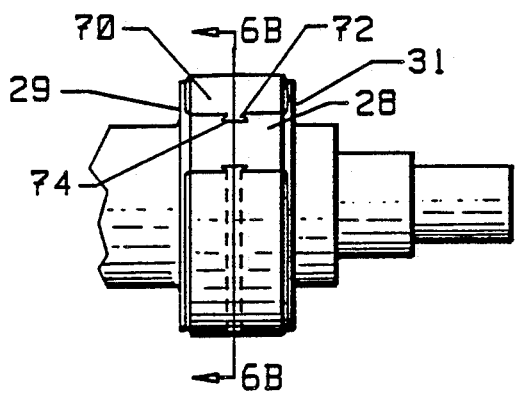
FIG. 6A is a side-elevational view of the rotor of FIG. 6.
Figure 6B:
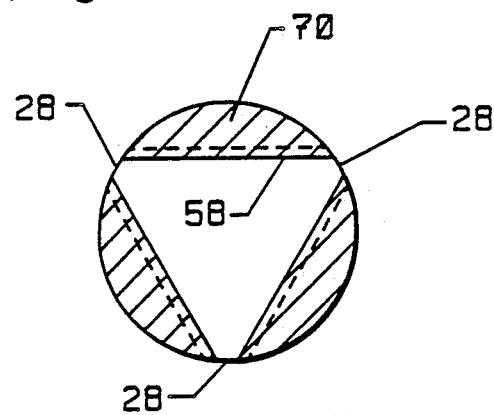
FIG. 6B is a cross-sectional view taken along lines A—A of FIG. 6A.
Figure 7:
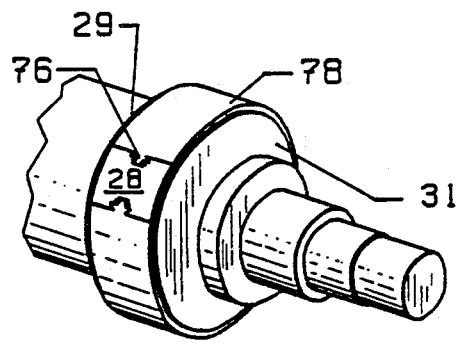
FIG. 7 is a partial isometric view of a further embodiment of a rotor constructed in accordance with the principles of the present invention, incorporating a christmas tree configured connection.
Figure 7A:
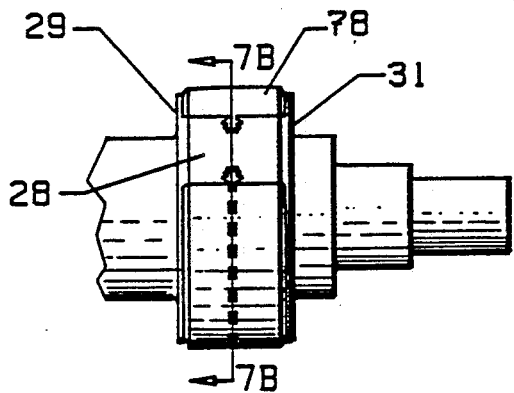
FIG. 7A is a side-elevational view of the rotor of FIG. 7.
Figure 7B:
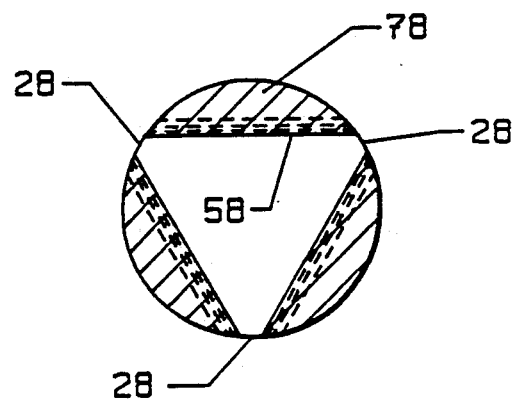
FIG. 7B is a cross-sectional view taken along lines B—B of FIG. 7A.

In the embodiment of FIGS. 6, 6A and 6B dove tail connections are used to secure non-magnetic filler pieces 70 within the interpole recesses. Each filler piece 70 is premachined with a dove tail 72 which can be inserted into a cooperating dove tail slot 74 premachined along the base 58 of an interpole recess. After transverse insertion of the filler piece 70 between the shrouds with dove tail 72 fitting in the corresponding dove tail slot 74, the filler piece 70 can be locked in place with keys or by upsetting the outer end of the dove tail material, in a fashion well known in the art. The outer surface of the filler pieces 70 can then be machined to the desired final cylindrical configuration. FIGS. 7, 7A and 7B illustrate a similar embodiment, except that a higher strength "christmas tree" slot type connection 76 is used to hold the interpole pieces 78 in place.

Figure 8:
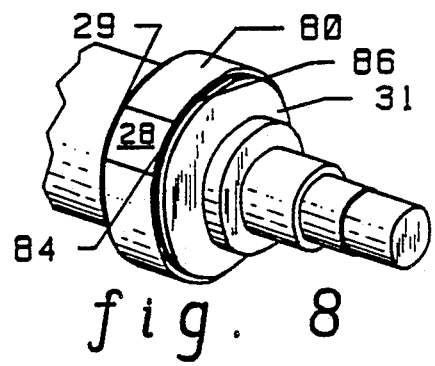
FIG. 8 is a partial isometric view of a still further embodiment of the present invention employing circumferential banding to secure inserts in interpolar recesses.
Figure 8A:
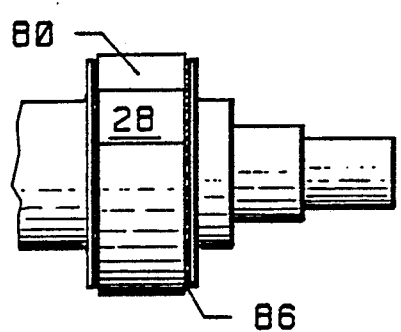
FIG. 8A is a side-elevational view of the rotor of FIG. 8.
Figure 8B:
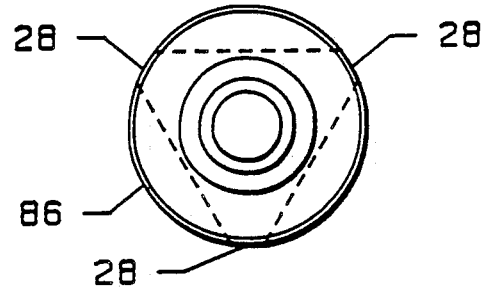
FIG. 8B is an end-elevational view of the rotor of FIG. 8.
Figure 9:
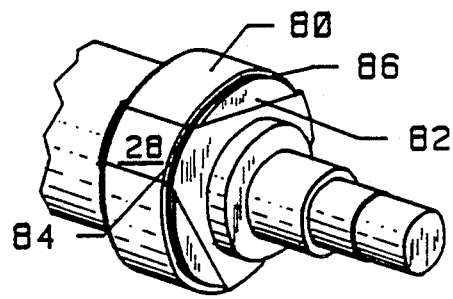
FIG. 9 is a partial isometric view of yet another embodiment of the present invention employing circumferential banding without shrouds.
Figure 9A:
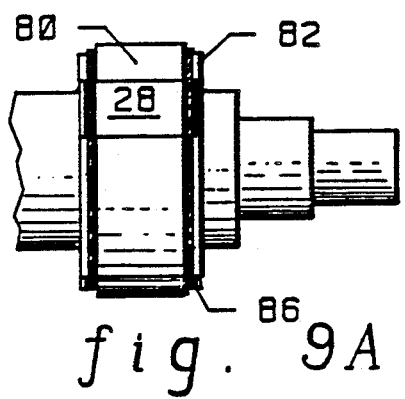
FIG. 9A is a side-elevational view of the rotor of FIG. 9.
Figure 9B:
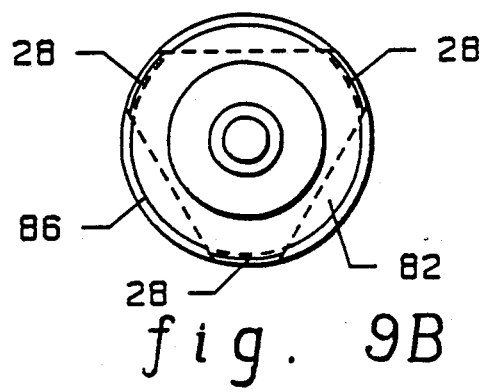
FIG. 9B is an end-elevational view of the rotor of FIG. 9.

FIG. 8, 8A and 8B show another approach for securing non-magnetic interpole pieces 80 to the magnetic rotor, using glass-resin soaked banding. Each interpole piece 80 is premachined to shape and provided with reduced radius axially extending ears 82 at each end thereof. Interpole piece 80 is then inserted in a recess between the inner shroud 29 and outer shroud 31. Circumferentially extending grooves 84, aligned with ears 82 are machined into the outer surface of salient poles 28. A pair of circumferential bands 86 are located in slots 84 and extend over the outer surface of ears 82. Bands 86 are preferably composed of glass-resin soaked banding under tension and are baked to cure. Bands 86 thus firmly secure the filler pieces 80 in the interpole recesses. FIGS. 9, 9A and 9B illustrate a similar mounting approach, sans shrouds.

From the foregoing description, it will be apparent that an improved rotor has been developed which exhibits reduced windage losses and a noticeable reduction in noise level. The new rotor is magnetically selfcentering, highly efficient and capable of operating at high speeds over sustained periods of time. The rotor of the present invention is amenable to rapid, ready and economical manufacture and assembly. Although several embodiments have been described and depicted herein, it will be apparent to those skilled in this art, that various modifications, additions, substitutions and the like may be made without departing from the spirit of the invention, the scope of which is defined by the claims appended hereto.

What is claimed is:

1. A rotor for a dynamoelectric machine characterized by reduced windage losses, the rotor being of a transverse pole, salient, homopolar construction, without windings, the rotor being rotatable about a central longitudinal axis, comprising:
   an axially extending, solid cylindrical body;
   a first set of circumferentially spaced, axially extending salient poles with circumferentially spaced recesses therebetween at one end of the cylindrical body and a second set of circumferentially spaced, axially extending salient poles with recesses therebetween at the other end of said cylindrical body;
   transversely extending inner shroud means located at the axially inner ends of said first and second sets of salient poles for shrouding axially inner ends of said recesses;
   transversely extending outer shroud means located att the axially outer ends of said first and second sets of salient poles for shrouding axially outer ends of said recesses;
   shaft means extending axially outward from said outer shroud means for mounting the rotor for rotation about the longitudinal axis, the outer and inner shroud means and salient poles being integral with said central cylindrical body; and
   wherein the integral shroud means, salient poles and cylindrical body are composed of magnetic material, and a relief is formed along a radially outer edge of the outer shroud means and of the inner shroud means such that the salient poles extend radially outward farther than the outer and inner shroud means to facilitate magnetic centering of the rotor.

2. The rotor of claim 1 wherein each outer shroud means comprises a generally flat disc-shaped member.

3. The rotor of claim 1 wherein each inner shroud means comprises an axially outer end portion of the central cylindrical body with a circumferentially extending relief machined in said portion.

4. The rotor of claim 1 wherein the inner shroud means extends radially outward farther than the central cylindrical body.

5. The rotor of claim 1 or claim 4 further comprising non-magnetic material filling said recesses and forming an outer cylindrical surface with each set of salient poles.

6. The rotor of claim 5 wherein the non-magnetic material is deposited in the recesses by a plasma-arc hot wire welding process and has a machined outer cylindrical surface.

7. The rotor of claim 5 wherein the non-magnetic material comprises machined inserts; and further comprises securing means for securing the inserts in said recesses.

8. The rotor of claim 7 wherein the securing means comprises fasteners extending through the inner shroud means, an insert, and the outer shroud means.

9. The rotor of claim 7 wherein said securing means comprises a dove tail connection.

10. The rotor of claim 9 wherein said connection has a christmas tree cross-sectional configuration.

11. The rotor of claim 7 wherein the securing means comprises circumferential banding.

12. The rotor of claim 11 wherein said banding comprises a pair of tensioned, cured glass-resin soaked bands extending about the inserts of each set near the axially inner and axially outer ends, respectively, of said inserts.

13. The rotor of claim 5 in combination with a stator assembly, the stator assembly comprising a non-magnetic spool-like support structure having a hollow, elongated central portion extending about the rotor, said spool-like structure having axially spaced end portions that extend radially outward relative to the longitudinal axis from respective ends of said central portion, and a circumferentially distributed plurality of generally U-shaped, generally longitudinally extending armature cores supported by the end portions of said spool-like structure.

14. The apparatus of claim 13 wherein said stator assembly further comprises a field winding coiled about the central portion of said spool-like structure; and
   wherein said shaft means are integral with the outer shroud means.

15. A rotor for a dynamoelectric machine characterized by reduced windage losses, the rotor being of a transverse pole, salient, homopolar construction, without windings, the rotor being rotatable about a central longitudinal axis, comprising:
   an axially extending, solid cylindrical body;
   a first set of circumferentially spaced, axially extending salient poles with recesses therebetween at one end of the cylindrical body and a second set of circumferentially spaced, axially extending salient poles with recesses therebetween at the other end of said cylindrical body;
   non-magnetic inserts mounted in the recesses between salient poles of each set, said inserts forming an outer circumferential cylindrical surface with the salient poles, each insert having an ear at its outer and inner axial ends, the ears of the inserts extending less in the radial direction than the remainder of the insert; and
   inner banding circumferentially extending about the axially inner ears of the inserts in each of said sets, and outer banding circumferentially extending around the axially outer ears of the inserts of each set, said banding serving to secure the inserts within the recesses.

16. The rotor of claim 15 wherein said banding comprises tensioned, cured glass-resin soaked banding and wherein the salient poles are provided with circumferentially extending grooves at their axially inner and axially outer ends to receive therein the inner banding and outer banding, respectively.

* * * * *